US012604358B2

(12) United States Patent
Shaw et al.

(10) Patent No.: US 12,604,358 B2
(45) Date of Patent: Apr. 14, 2026

(54) NETWORK-AIDED MULTI-LINK OPERATION FOR SINGLE-RADIO DEVICES

(71) Applicant: Cypress Semiconductor Corporation, San Jose, CA (US)

(72) Inventors: Amit Shaw, Bangalore (IN); Naga Lakshmana Sundeep Kancherla, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 313 days.

(21) Appl. No.: 18/360,527

(22) Filed: Jul. 27, 2023

(65) Prior Publication Data

US 2025/0039971 A1 Jan. 30, 2025

(51) Int. Cl.
| | |
|---|---|
| *H04W 76/20* | (2018.01) |
| *H04W 74/0808* | (2024.01) |
| *H04W 74/0816* | (2024.01) |
| *H04W 76/15* | (2018.01) |
| *H04W 84/12* | (2009.01) |
| *H04W 88/06* | (2009.01) |

(52) U.S. Cl.
CPC ....... *H04W 76/20* (2018.02); *H04W 74/0808* (2013.01); *H04W 84/12* (2013.01)

(58) Field of Classification Search
CPC . H04W 76/15; H04W 76/20; H04W 74/0808; H04W 74/0816; H04W 74/08; H04W 74/0825; H04W 84/12
See application file for complete search history.

(56) References Cited

U.S. PATENT DOCUMENTS

| | | | | |
|---|---|---|---|---|
| 12,144,063 | B2 * | 11/2024 | Chu | H04L 1/1621 |
| 12,328,759 | B2 * | 6/2025 | Xu | H04W 74/0808 |
| 12,452,921 | B2 * | 10/2025 | Jang | H04L 1/00 |
| 2007/0116035 | A1 * | 5/2007 | Shao | H04W 74/08 370/461 |
| 2015/0341954 | A1 * | 11/2015 | Li | H04W 74/08 370/392 |
| 2016/0119872 | A1 * | 4/2016 | Kim | H04W 72/535 370/311 |
| 2016/0345278 | A1 * | 11/2016 | Chu | H04W 56/001 |
| 2018/0007692 | A1 * | 1/2018 | Trainin | H04W 24/10 |
| 2018/0103491 | A1 * | 4/2018 | Sundman | H04W 74/0816 |
| 2018/0213558 | A1 * | 7/2018 | Kim | H04W 74/08 |
| 2018/0279170 | A1 * | 9/2018 | Sakamoto | H04B 7/088 |
| 2019/0158321 | A1 * | 5/2019 | Liu | H04W 8/08 |
| 2020/0351939 | A1 * | 11/2020 | Lin | H04L 5/0053 |
| 2021/0195540 | A1 * | 6/2021 | Fischer | H04W 56/0005 |
| 2021/0212118 | A1 * | 7/2021 | Lu | H04W 74/0816 |
| 2022/0167397 | A1 * | 5/2022 | Thangarasa | H04W 74/08 |
| 2022/0345973 | A1 * | 10/2022 | Sun | H04W 76/15 |
| 2023/0040910 | A1 * | 2/2023 | Hwang | H04W 74/0808 |
| 2023/0073868 | A1 * | 3/2023 | Nayak | H04W 74/0816 |
| 2023/0164784 | A1 * | 5/2023 | Hirata | H04W 74/0816 370/329 |
| 2023/0269825 | A1 * | 8/2023 | Handte | H04W 76/34 370/328 |

(Continued)

*Primary Examiner* — Jenee Holland

(57) ABSTRACT

A system includes a first multi-link operation (MLO) device and a second MLO device. The first MLO device is to send a frame to the second MLO device via a first link. The frame includes a link occupancy information field, including link occupancy information of a second link.

17 Claims, 6 Drawing Sheets

(56) References Cited

U.S. PATENT DOCUMENTS

| | | | |
|---|---|---|---|
| 2023/0328669 A1* | 10/2023 | Naik | H04W 56/0015 |
| | | | 370/350 |
| 2023/0389101 A1* | 11/2023 | Hong | H04W 48/16 |
| 2024/0008087 A1* | 1/2024 | Park | H04W 74/002 |
| 2024/0129978 A1* | 4/2024 | Yun | H04W 24/08 |
| 2024/0154636 A1* | 5/2024 | Asterjadhi | H04B 1/3805 |
| 2024/0187191 A1* | 6/2024 | Kenney | H04L 5/0053 |
| 2024/0340885 A1* | 10/2024 | Wang | H04W 74/002 |
| 2024/0381419 A1* | 11/2024 | Ajami | H04W 74/0816 |
| 2025/0031262 A1* | 1/2025 | Fang | H04W 76/20 |
| 2025/0070925 A1* | 2/2025 | Zhang | H04L 5/0005 |
| 2025/0133554 A1* | 4/2025 | Patil | H04W 72/12 |
| 2025/0344242 A1* | 11/2025 | Ratnam | H04W 74/002 |
| 2025/0374171 A1* | 12/2025 | Kim | H04W 48/10 |

* cited by examiner

Figure 4:
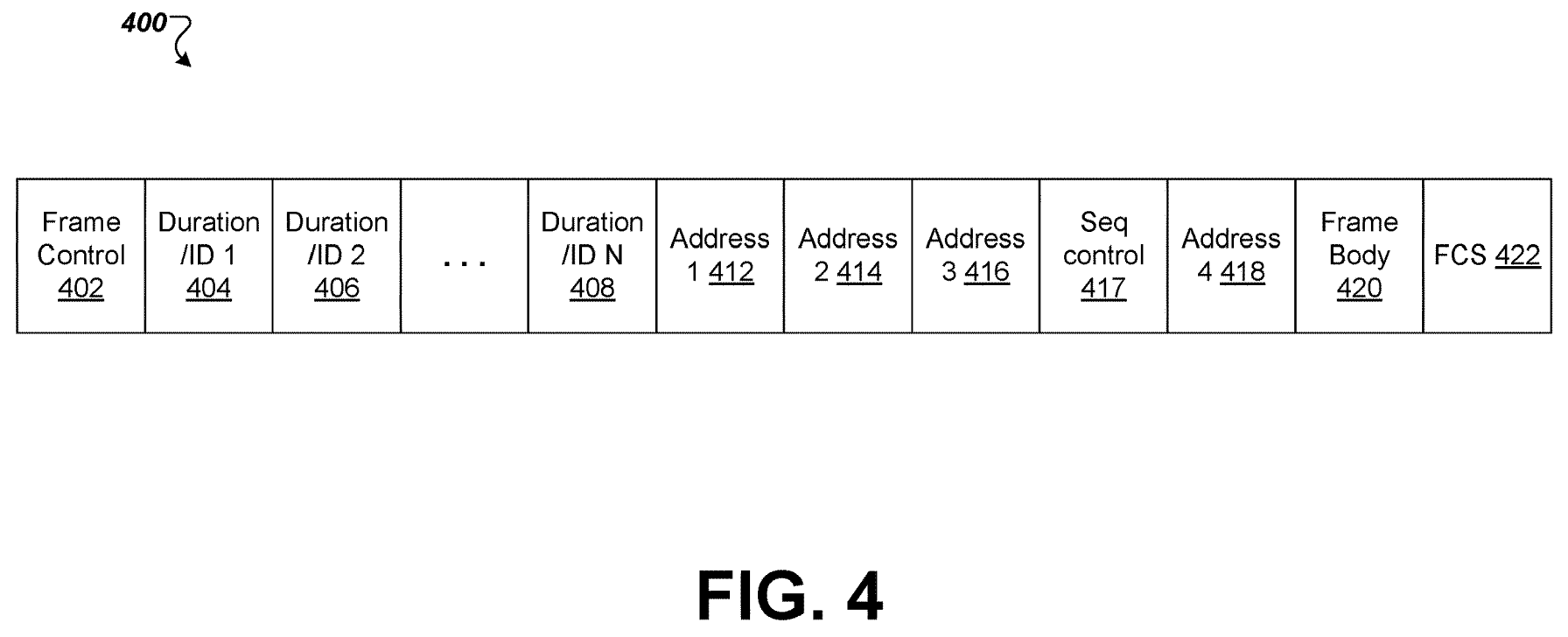

| Frame Control 402 | Duration /ID 1 404 | Duration /ID 2 406 | . . . | Duration /ID N 408 | Address 1 412 | Address 2 414 | Address 3 416 | Seq control 417 | Address 4 418 | Frame Body 420 | FCS 422 |
|---|---|---|---|---|---|---|---|---|---|---|---|

NETWORK-AIDED MULTI-LINK OPERATION FOR SINGLE-RADIO DEVICES

TECHNICAL FIELD

This disclosure relates to wireless devices and, more specifically, to network-aided multi-link operation for single-radio devices.

BACKGROUND

Wireless local network (WLAN) technology has evolved over generations of development. The latest generation of WLAN devices is based on a multi-link operation (MLO) framework where devices can connect using multiple links/ channels. Depending upon the complexity of a device, new standards, such as Wi-Fi® 7 (802.11be), define different classes of devices. Simultaneous transmit and receive (STR) devices have more than one parallel link and can independently and simultaneously perform transmit (Tx) and receive (Rx) operations over those links. Being able to monitor using physical carrier sense (P-CRS) and virtual carrier sense (V-CRS) and perform channel access control on multiple links/channels simultaneously, these devices can send latency-critical traffic on any of the links based on link/channel access and availability. Multi-link single-radio (MLSR) devices have multiple links but can operate (Tx and Rx) on only one link at any time. Hence MLSR devices do not have access to P-CRS or V-CRS in real time for other links. This prevents MLSR devices from performing any real-time link/channel access and/or selection, limiting their performance in terms of latency achievable compared to other device classes. MLSR devices' inability to perform any real-time link access and/or selection also affects the design complexity in terms of link/channel probing. Enhanced MLSR (eMLSR) devices have added control link(s), which can monitor all links/channels simultaneously, providing access to P-CRS and V-CRS across all links/channels. However, this comes at the cost of more silicon area and power consumption.

BRIEF DESCRIPTION OF THE DRAWINGS

FIG. 4 is a diagram illustrating a frame format for network-aided multi-link operation for single-radio devices, according to some embodiments.

DETAILED DESCRIPTION

Figure 1:
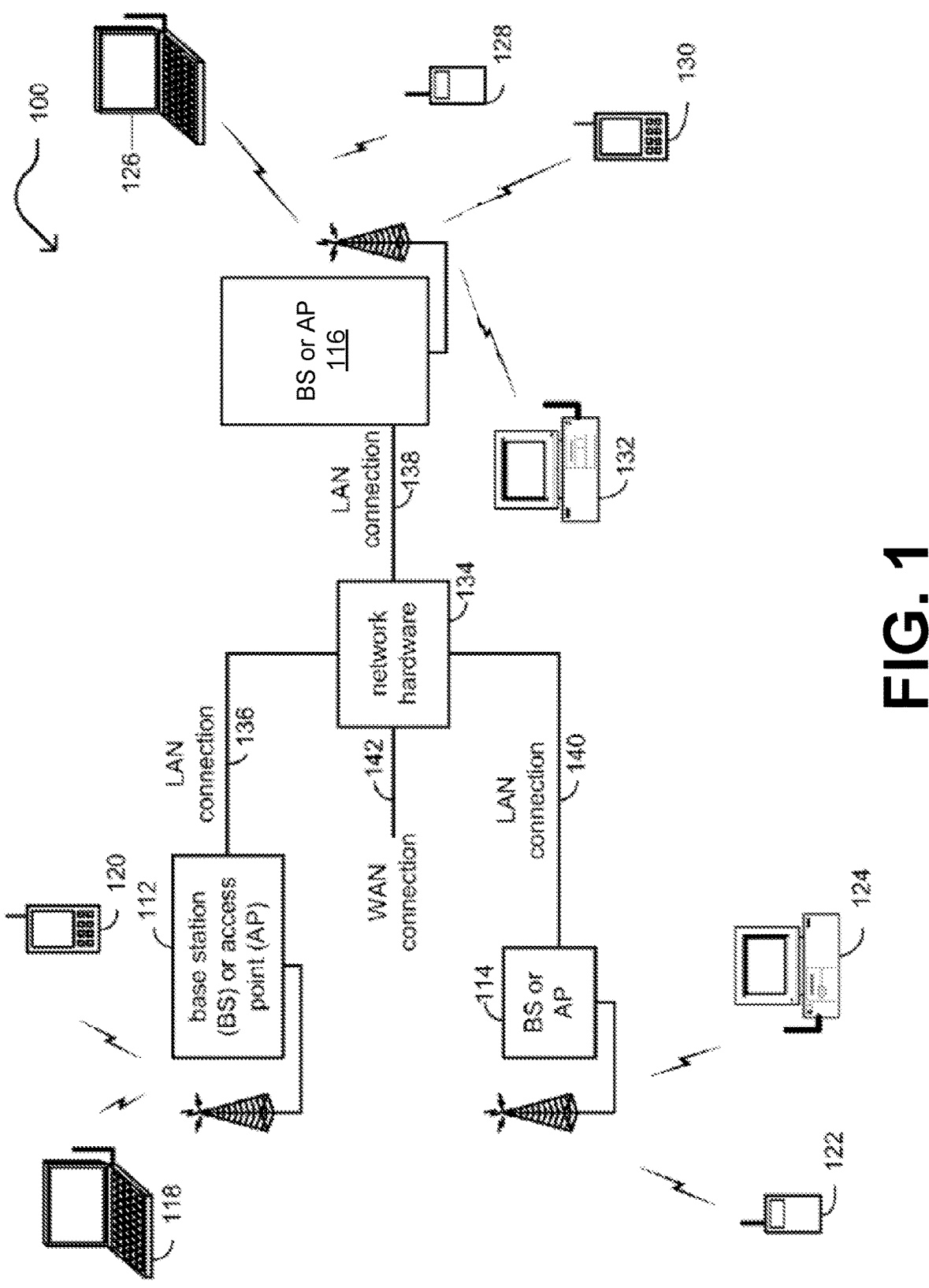
FIG. 1 is a block diagram of an exemplary wireless communication system according to some embodiments.

The following description sets forth numerous specific details, such as examples of specific systems, devices, components, methods, and so forth, in order to provide a good understanding of various embodiments of network-aided multi-link operation for single-radio devices. Wireless local network (WLAN) technology has evolved over generations of development. The latest generation of WLAN devices is based on a multi-link operation (MLO) framework where devices can connect using multiple links/channels. Prior to Wi-Fi® 7, a link is a logical connection between a client device and an access point or router established on a specific channel frequency. In other words, a link may only be able to operate on one channel frequency at a time where link has been established, and the link cannot be used for any other channel frequency (i.e., one channel frequency is assigned to a single link). Client device provides one Service Access Point (SAP) to the higher layer which is mapped to the link. However, Wi-Fi® 7 includes proposed multi-link operation technology where multiple links can be established, each link using a different channel frequency while providing services using one SAP to the higher layer. In other words, the SAP is mapped to multiple links.

Depending upon the complexity of a device, Wi-Fi® 7 standards define different classes of devices. Simultaneous transmit and receive (STR) devices have more than one parallel link and can independently and simultaneously perform transmit (Tx) and receive (Rx) operations over those links. Being able to monitor using physical carrier sense (P-CRS) and virtual carrier sense (V-CRS) and perform channel access control on multiple links/channels simultaneously, these devices can send latency critical traffic on any of the links based on link/channel access and availability.

Multi-link single-radio (MLSR) devices have multiple links but can only operate (Tx and Rx) on one link at a time. Hence MLSR devices do not have access to P-CRS or V-CRS in real time for other links. This prevents MLSR devices from performing any real-time link/channel access and/or selection, limiting their performance in terms of latency achievable compared to other device classes. Such a design optimizes the device cost but has significant limitations in terms of latency performance. The inability of MLSR devices to perform any real-time link access and/or selection also affects the design complexity in terms of link/channel probing.

Enhanced MLSR (eMLSR) devices have added control link(s), which can monitor all links/channels simultaneously, providing access to P-CRS and V-CRS across all links/channels. However, this comes at the cost of more silicon area and power consumption.

To resolve these and other deficiencies and improve the limitation of MLSR devices, the present disclosure sets forth network-aided multi-link operation for single-radio devices. By sharing link occupancy information (e.g., network allocated vector (NAV) information) of other links on a link (if the device is currently not operating on the other links), MLSR devices can obtain some information about other links/channels occupancy information (e.g., V-CRS) and hence improve upon the limitation inherent in MLSR devices by incorporating this information in decision making of link/channel switching. Further, by sharing link occupancy information, including remaining transmission opportunity (TxOP) duration information on other links (if the sharing device is currently participating in a transaction over the other links), MLSR devices can obtain some information about other links/channels occupancy information (e.g., V-CRS) and hence improve upon the limitation inherent in those devices by incorporating this information in decision making of link/channel switching. This, in turn, helps MLSR devices to have an improved latency and/or power saving by avoiding unnecessary link/channel switching, as well as improved design complexity in terms of link/channel probing.

Thus, in at least some embodiments, a system is disclosed, including a first MLO device and a second MLO device. In some embodiments, the first MLO device is at least one of an STR device or an eMLSR device, and the second MLO device is an MLSR device. In some embodiments, the first MLO device sends a frame to the second MLO device via a first link. In some embodiments, the frame includes a link occupancy information field comprising link occupancy information of a second link. In some embodiments, the second MLO device receives the frame via the first link, extracts the link occupancy information of the second link, and determines whether to switch to the second link based on the link occupancy information of the second link. In some embodiments, the link occupancy information of the second link contained in the frame indicates that a status of the second link is unknown.

In some embodiments, the frame may be a legacy frame having multiple fields, of which some may be legacy fields. For example, in some embodiments, the link occupancy information field may be added to the existing legacy frame (i.e., in addition to the multiple legacy fields already existing in legacy frames). A legacy frame may refer to a type of frame format used in earlier versions of a wireless protocol or standard (e.g., the IEEE wireless standards 802.11ax, 802.11b, 802.11a, 802.11n, 802.11ac, etc.). Fields contained in legacy frames may also be referred to as legacy fields (a field used in frames of an earlier version of a wireless protocol or standard). A legacy field may refer to a type of field used in frames of earlier versions of a wireless protocol or standard (e.g., the IEEE wireless standards 802.11ax, 802.11b, 802.11a, 802.11n, 802.11ac, etc.). Legacy frames have a frame format that includes fields for the media access control (MAC) header, the frame body, and the frame check sequence (FCS) field. In some embodiments, the link occupancy information field may be added to the existing legacy frame (i.e., in addition to the multiple legacy fields already existing in legacy frames).

Alternatively, the frame sent to the second MLO device via the first link by the first MLO device may be at least one of an MLO-compliant request-to-send (RTS) frame or an MLO-compliant clear-to-send (CTS) frame as proposed. In some embodiments, an MLO-compliant RTS frame or an MLO-compliant CTS frame may be a legacy RTS or CTS frame. RTS and CTS frames are two control frames used in the IEEE 802.11 WLAN standard to manage access to the wireless medium. Each contains a duration/ID field specifying the amount of time that the sender will be occupying the wireless medium. This helps to prevent other devices from transmitting during that time. In some embodiments, an MLO-compliant RTS frame or an MLO-compliant CTS frame may contain link occupancy information of some or all of the links or channels in a network. Such an MLO-compliant RTS frame or an MLO-compliant CTS frame may be received by any device on the network that is occupying the channel or medium the frames are sent on. In some embodiments, the link occupancy information comprises link occupancy duration information (e.g., NAV timers, TxOP, etc.). In some embodiments, the link occupancy information includes at least one of network allocation vector (NAV) information, or TxOP information corresponding to that link. Additional embodiments and variations in implementation will be discussed in detail with reference to FIGS. 1-6.

Current multi-link operation for MLSR devices does not give MLSR devices access to a virtual carrier sense (V-CRS) of other links/channels. The only way for MLSR devices to obtain such carrier sense information is via a physical carrier sense (P-CRS) by performing a channel switch operation and physically probing the channel (e.g., via a P-CRS). As mentioned, a channel switch operation has an associated switching time or latency that may add to the overall latency of a transmission. In some examples, under the current multi-link operation, an MLSR device may need to perform a Tx operation, however, the link/channel on which the MLSR device is currently active, is not available. In this scenario, the MLSR device will perform a channel switch operation to access the CRS for another link/channel. In some examples, an MLRS device may have to perform multiple channel switch operations (adding multiple channel switches times or latency periods to an operation) before it can transmit the queued frame(s), thus increasing latency for those frame(s).

The present disclosure includes a number of advantages, including causing MLSR devices to have the ability to perform some real-time link access and/or selection. Further, present disclosure causes MLSR devices to have an improved latency and/or power saving by avoiding unnecessary link/channel switching. This approach also results in improved design complexity in terms of link/channel probing. Additional advantages will be apparent to those skilled in the art of modern wireless technologies and recent IEEE standards. It should be noted that the present disclosure is not limited to applications in Wi-Fi® technologies but may be implemented with any standard that uses multi-link operation.

FIG. 1 is a block diagram of an exemplary wireless communication system 100 according to some embodiments. In these embodiments, the wireless communication system 100 includes base stations and/or access points 112-116 (which can be referred to interchangeably herein), wireless devices 118-132 (e.g., wireless stations (STAs) and other such wireless communication devices), and a network hardware component 134. The wireless devices 118-132 may be laptop computers 118 or tablets 126, personal digital assistants 120 and 130, personal computers 124 and 132, and/or cellular telephones 122 and 128. The details of an embodiment of such wireless devices when acting as transmission devices are described in greater detail hereinafter.

In embodiments, the base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in an area reachable by each respective base station or access point. Typically, the wireless devices register with a particular base station or access point 112-116 to receive services from the communication system 100. For direct connections (i.e., point-to-point communications), wireless communication devices communicate directly via an allocated channel.

Any of the various wireless devices 118-132 and BSs or APs 112-116 may include a processor and a communication interface to support communications with any other of the wireless devices 118-132 and BSs or APs 112-116. In an example of operation, a processor and the communication interface implemented within one of the devices (e.g., any one of the wireless devices 118-132 and BSs or APs 112-116) are configured to process at least one signal received from and/or to generate at least one signal to be transmitted to another one of the devices (e.g., any other one of the wireless devices 118-132 and BSs or APs 112-116).

Note that general reference to a communication device, such as a wireless device (e.g., wireless devices) 118-132 and BSs or APs 112-116 in FIG. 1, or any other communication devices and/or wireless communication devices may alternatively be made generally herein using the term 'device' for brevity. The processor and the communication interface of any one of the various devices, wireless devices 118-132 and BSs or APs 112-116, may be configured to support communications with any other of the various devices, wireless devices 118-132 and BSs or APs 112-116. Such communications may be unidirectional or bidirectional between devices.

In an example of operation, the AP/BS device 116 (representative of any of the BS or AP 112-116) includes a communication interface and a processor configured to receive one or more signals from devices 130 and 132. Considering an example, device 116 is an STR device or an eMLSR device. Device 132 is an MLSR device that receives a transmit (Tx) request from a host (e.g., device 132). Device 116 sends a frame (e.g., control frame, RTS frame, data frame, and/or the like) containing link occupancy information of a second link via the first link. Device 132 receives the frame containing the link occupancy information of the first and second link and determines whether to use the first link or the second link to transmit based on the P-CSR and V-CRS of first link and the link occupancy information of the second link contained in the frame.

Figure 2:
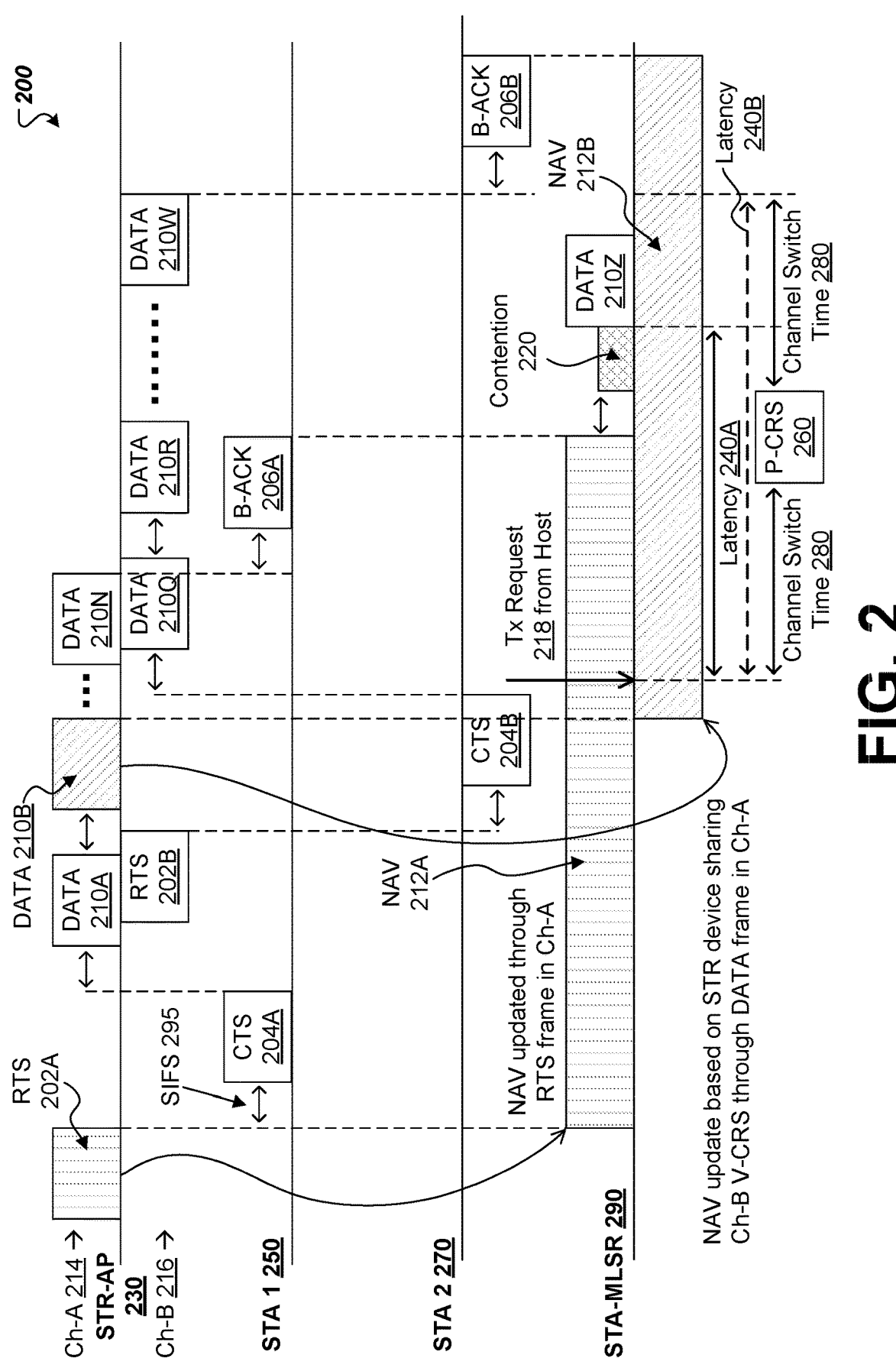
FIG. 2 is a simplified timing diagram illustrating a network-aided multi-link operation for single-radio devices, according to some embodiments.

FIG. 2 is a simplified timing diagram 200 illustrating a network-aided multi-link operation for single-radio devices, according to some embodiments.

FIG. 2 shows the interaction of an STR-AP 230 with other station (STA) devices (e.g., STA 1 250, STA 2 270, and/or STA-MLSR 290) using network-aided multi-link operation for single-radio devices, according to some embodiments. In some embodiments, an AP device may be an STR device. For example, in some embodiments, STR-AP 230 may be an STR device operating simultaneously on two channels (channel A 214 and channel B 216). STA 1 250 interacts with STR-AP 230 on channel A 214. STR-AP 230 sends an RTS frame 202A embedded with link occupancy information of channel A 214. Although a frame (e.g., RTS frame 202A) is intended for a particular station (e.g., STA 1 250), all devices on the network can receive the frame via a first channel and extract embedded link occupancy information of other channels. Although the data in a data frame cannot be decrypted by a device that is not the target device, all devices can receive and decode the NAV information.

In some embodiments, link occupancy information includes a duration (i.e., for how long the channel or link will be occupied). In some embodiments, link occupancy information, including duration information, is calculated by adding up the time elapsed during each of the frames (control frames, RTS frames, CTS frames, data frames, B-ACK frames, and/or the like) to be sent during a transmission and includes short interframe spaces (SIFS) (e.g., SIFS 295) in the calculation.

STA 1 250 sends a CTS frame 204A via channel A 214, and the transmission begins on channel A 214. STR-AP 230 sends data frames 210A-N on channel A 214 to STA 1 250. Once all data frames have been sent on channel A 214, STA

1 250 sends a block acknowledgment (B-ACK) frame 206A to STR-AP 230 on channel A 214, signaling the end of the transmission and the end of NAV timer 312A.

STA-MLSR 290, operating on channel A 214, receives RTS frame 202A during the transmission and extracts the embedded link occupancy information (e.g., NAV 212A) of channel A 214. In some embodiments, a NAV may be a timer indicating the time remaining for an ongoing transmission on a channel. In some embodiments, NAV information and/or NAV timers are maintained by an AP device (e.g., STR-AP 230) for each link/channel on the network and each device associated with the AP on the network. STA 2 270 interacts with STR-AP 230 on channel B 216. STA 2 270, after receiving an RTS frame 202B from STR-AP 230, sends a CTS frame 204B via channel B 216. STR-AP 230 begins transmitting on channel B 216, sending data frames 210Q-W STA 2 270. Once all data frames have been sent on channel B 216, STA 2 270 sends a B-ACK frame 206B to STR-AP 230 on channel B 216, signaling the end of the transmission and the end of NAV timer 312B.

STR-AP 230 sends a data frame 210B embedded with link occupancy information of channel B 216. STA-MLSR 290, operating on channel A 214, receives data frame 210B during the transmission and extracts the embedded link occupancy information (e.g., NAV 212B) of channel B 216.

STA-MLSR 290, operating on channel A 214, receives a Tx request 218 from a host. Using the extracted link occupancy information of channel A 214 and channel B 216, STA-MLSR 290 determines which channel to use to fulfill Tx request 218. When an MLSR device switches channels, there is an associated channel switch time (e.g., channel switch time 280). In absence of other link/channel occupancy information an MLSR device will have to switch channels when the current link/channel is occupied to know the link/channel occupancy of other links/channels. Channel switch time 280 will add to the transmit latency of an MLSR device because of the increased latency associated with switching channels. For example, STA-MLSR 290, upon receiving Tx request 218, could switch to channel B 216 without knowing the status of channel B. Such a switch could result in STA-MLSR 290 finding via a P-CRS 260 that channel B is occupied and will be occupied for longer than it takes for STA-MLSR 290 to switch back to channel A 314. After performing another channel switch 280 back to channel A 214, the overall latency increases (e.g., from latency 240A to latency 240B).

However, the link occupancy information of channel B 216 sent to STA-MLSR 290 in data frame 210B allows STA-MLSR 290 to have (in effect) a V-CRS and thus avoid multiple channel switches. STA-MLSR 290 determines, based on embedded link occupancy information of channel A 214 and channel B 216 (e.g., NAV 212A-B), to stay on channel A 214 to transmit because the link occupancy information of channel B (i.e., NAV 212B) indicates that channel A 214 will become available before channel B 216. In this example, MLSR-STA 290 device determines not to switch channels (e.g., from channel A 214 to channel B 216), resulting in improved latency (e.g., latency 240A) for data frame 210Z.

Once STA 1 250 has finished transmitting on channel A 214, STA-MLSR 290 contends for channel (see contention 220) on channel A 214 and then begins transmitting on channel A 214, beginning with data frame 210Z.

In some embodiments, MLSR station 290 may have access to channel occupancy information (e.g., NAVs 212B) of a second link (e.g., channel B 216). The link occupancy information may be embedded in a frame of another device (e.g., data frame 210B) and may be sent to MLSR-STA 290 via a first link (e.g., channel A 214). Such link occupancy information helps MLSR-STA 290 to determine if a channel switch operation may improve the latency of the packet (e.g., data frame 210Z).

A field is to be included in a frame per link/channel to indicate the duration for which the corresponding link/channel will be busy as sensed by transmitting device. In some embodiments, a value (e.g., 0xFFFF) can be reserved for indicating that the link/channel status is unknown (as the device transmitting that frame may not have access to other link/channel occupancy). In some embodiments, a value of 0x0000 may indicate that a link/channel is available for channel access. In some embodiments, a SIFS (e.g., SIFS 295) is a time duration that passes between transmission of frames as defined in the Wi-Fi® standards. In some embodiments, SIFS may be a type of interframe space (i.e., a period of time that is required to pass between the transmissions of two different frames on the network).

Figure 3:
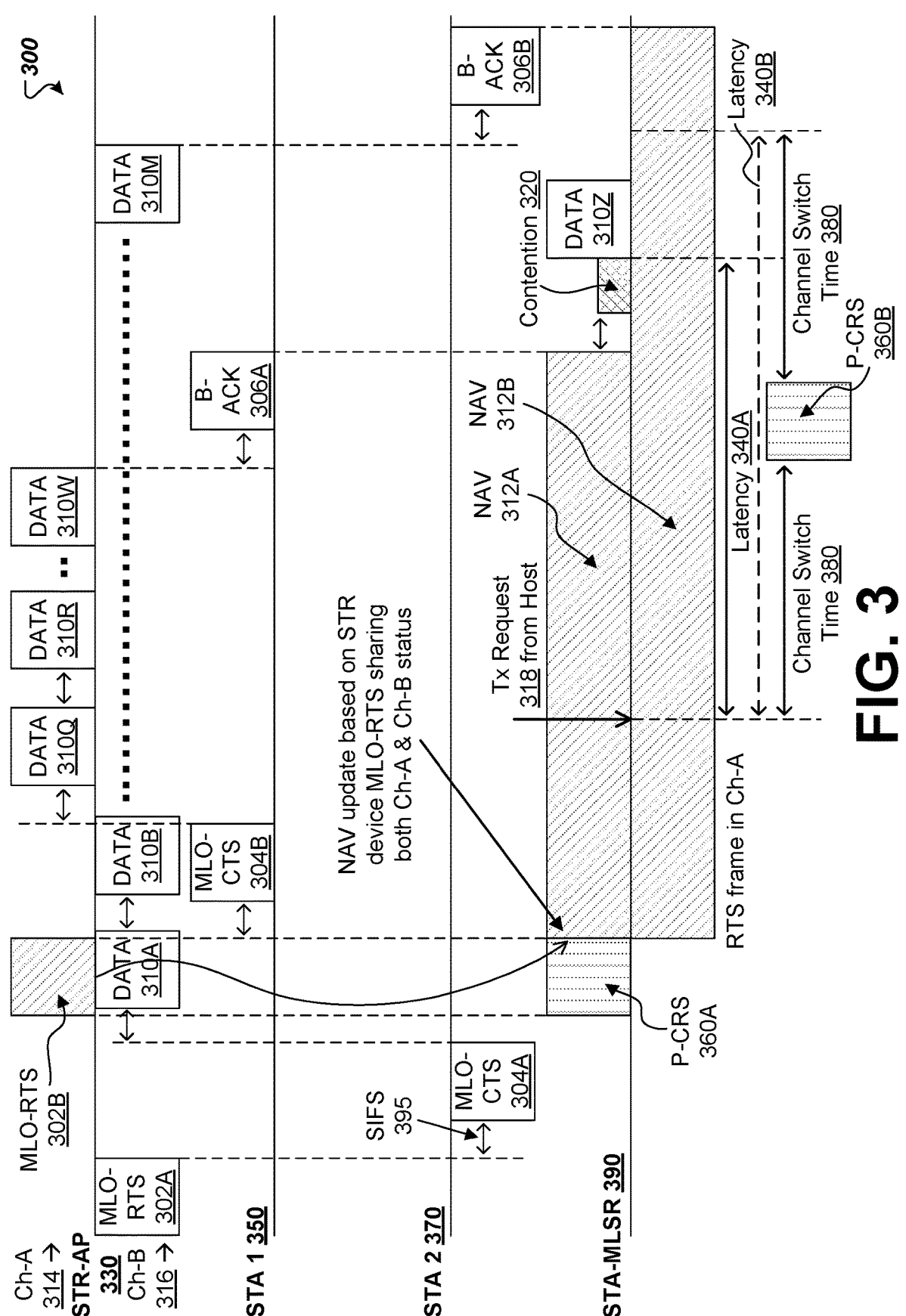
FIG. 3 is a simplified timing diagram illustrating a network-aided multi-link operation for single-radio devices, according to some embodiments.

FIG. 3 is a is a simplified timing diagram 300 illustrating a network-aided multi-link operation for single-radio devices, according to some embodiments.

In some embodiments, the link occupancy information may be included as part of an RTS or CTS frame modified to suit an MLO information exchange (e.g., MLO-complaint RTS or CTS). Such MLO-compliant RTS or CTS frames allow an MLSR device to have access to link/channel occupancy information based on RTS or CTS frames received from other devices in the network. Such access to link/channel occupancy information allows the MLSR device to determine if a channel switch is likely to improve or worsen (i.e., shorten or lengthen) the latency of the packet to be transmitted. In some examples, an MLSR device determines not to switch channels resulting in improved latency for that frame.

FIG. 3 shows the interaction of an STR-AP 330 with other station devices (e.g., STA 1 350, STA 2 370, and/or STA-MLSR 390) using network-aided multi-link operation for single-radio devices, according to some embodiments. For example, in some embodiments, STR-AP 330 may be an STR device operating simultaneously on two channels (channel A 314 and channel B 316). STA 1 350 interacts with STR-AP 330 on channel A 314. STA 2 370 interacts with STR-AP 330 on channel B 316. STR-AP 330 sends an MLO-compliant RTS (MLO-RTS) frame 302A. STA 2 370 sends an MLO-compliant CTS frame 304A to STR-AP 330, and transmission of data frames 310A-M begins on channel B 316. Once all data frames have been sent by STR-AP 330 on channel B, STA 2 370 sends a B-ACK 306B to signal the end of the transmission, and the NAV timer 312B expires.

In some embodiments, link occupancy information includes a duration (i.e., for how long the channel or link will be occupied). In some embodiments, link occupancy information, including duration information, is calculated by adding up the time elapsed during each of the frames (control frames, RTS frames, CTS frames, data frames, B-ACK frames, and/or the like) to be sent during a transmission and includes short interframe spaces (SIFS) (e.g., SIFS 395) in the calculation.

STA 1 350 interacts with STR-AP 330 on channel A 314. STR-AP 330 sends an MLO-compliant RTS frame 302B embedded with link occupancy information of both channels A 314 and channel B 316. STA 1 350 sends an MLO-compliant CTS frame 304B to STR-AP 330, and transmission of data frames 310Q-W begins on channel A 314. Once all data frames have been sent by STR-AP 330 on channel A 314, STA 1 350 sends a B-ACK 306A to signal the end of the transmission, and the NAV timer 312A expires.

Although a frame (e.g., MLO-RTS frame 302B) is intended for a particular station (e.g., STA 1 350), all devices on the network can receive the frame via a first channel (e.g., channel A 314) and extract any embedded link occupancy information of other channels. In some embodiments, because STA-MLSR operates on channel A 314, STA-MLSR 390 may perform a P-CRS (e.g., P-CRS 360A) on channel A 314 to verify link occupancy information. In some embodiments, a NAV or NAV timer may be a timer indicating the time remaining for an ongoing transmission on a channel.

STA-MLSR 390, operating on channel A 314, receives a Tx request 318 from a host. Using the extracted link occupancy information of channel A 314 and channel B 316 from MLO-compliant RTS frame 302B, STA-MLSR 390 determines which channel to use to fulfill Tx request 318.

When an MLSR device switches channels, there is an associated channel switch time (e.g., channel switch time 380). In absence of other link/channel occupancy information an MLSR device will have to switch channels when current link/channel is occupied to know the link/channel occupancy of the other links/channels. Channel switch time 380 also add to the transmit latency of MLSR devices because of the increased latency associated with switching channels. For example, if STA-MLSR 390, upon receiving Tx request 318, switched to channel B 316 without knowing the status of channel B 316, it would find via a P-CRS 360B that channel B 316 is occupied for longer than it would take to switch back to channel A 314. After performing another channel switch 380 back to channel A 314, the overall latency increases (e.g., from latency 340A to latency 340B).

However, the link occupancy information of channel A 314 and channel B 316 sent to STA-MLSR 390 in MLO-compliant RTS frame 302B allows STA-MLSR 390 to have (in effect) a V-CRS and thus avoid multiple channel switches. STA-MLSR 390 determines, based on embedded link occupancy information of channel A 314 and channel B 316 (e.g., NAV 312A-B), to stay on channel A 314 to transmit because the link occupancy information of channel B (i.e., NAV 312B) indicates that channel A 314 will become available before channel B 316. In this example, MLSR-STA 390 determines not to switch channels (e.g., from channel A 314 to channel B 316), resulting in improved latency (e.g., latency 340A) for data frame 310Z.

Once STA 1 350 has finished transmitting on channel A 314, STA-MLSR 390 contends for access (see contention 320) on channel A 314 and then begins transmitting on channel A 314, beginning with data frame 310Z.

In some embodiments, MLSR station 390 may have access to channel occupancy information (e.g., NAV 312B) of a second link (e.g., channel B 316). The link occupancy information may be embedded in a frame of another device (e.g., MLO-RTS frame 302B) and may be sent to MLSR-STA 390 via a first link (e.g., channel A 314). Such link occupancy information helps MLSR-STA 390 to determine if a channel switch operation may improve the latency of the packet (e.g., data frame 310Z).

In some embodiments, a field is included in an MLO-compliant frame per link/channel to indicate the duration for which the corresponding link/channel will be busy as sensed by a transmitting device previously. In some embodiments, a value (e.g., 0xFFFF) can be reserved for indicating that the link/channel status is unknown (as the device transmitting that frame may not have access to other link/channel occupancy). In some embodiments, a value of 0x0000 may indicate that a link/channel is available for channel access. In some embodiments, a SIFS (e.g., SIFS 395) is a time duration that passes between transmission of frames as defined in the Wi-Fi® standards. In some embodiments, SIFS may be a type of interframe space (i.e., a period of time that is required to pass between the transmissions of two different frames on the network).

FIG. 4 is a diagram 400 illustrating a frame format for network-aided multi-link operation for single-radio devices, according to some embodiments. In WLAN communication, frames are used to exchange data between devices. There may be several types of frames, including RTS frames, CTS frames, acknowledgment (ACK) frames, block-acknowledgment frames, data frames, etc.

In some embodiments, frame control field 402 is followed by duration/ID fields 1 through N. In some embodiments, the duration field indicates the amount of time the transmitter intends to occupy the channel. This duration includes the time it will take to send the data packet plus any additional time needed for CTS/ACK frames. In some embodiments, the duration field specifies the amount of time that the receiver will occupy the channel. In some embodiments, the duration fields may include NAVs and/or NAV timers. This duration includes the time the receiver needs to receive the data packet and send an ACK frame back to the transmitter. In some embodiments, duration/ID frames may be included for all links/channels in a network.

In some embodiments, address fields 1 to 4 follow duration/ID fields 1 to N. In some embodiments, a sequence control field 417 may be inserted between at least two of the address fields 1 to 4 (e.g., sequence control field 417 follows address fields 1 to 3 and precedes address field 4 418). In some embodiments, a frame body 420 follows address field 418. In some embodiments, an FCS field 422 follows frame body 420. In some embodiments, the duration/ID fields contain the duration information of multiple links (e.g., link occupancy information) in the MAC Headers of control frames and/or data frames. In some embodiments, the duration/ID fields contain the duration information for links (e.g., link occupancy information) in special MLO-RTS/MLO-CTS frames (e.g., MLO-compliant RTS frame 302B of FIG. 3). The link occupancy information contained in the duration/ID fields of a frame sent via a certain link may correspond to that link and/or any other links/channels in the network.

Figure 5:
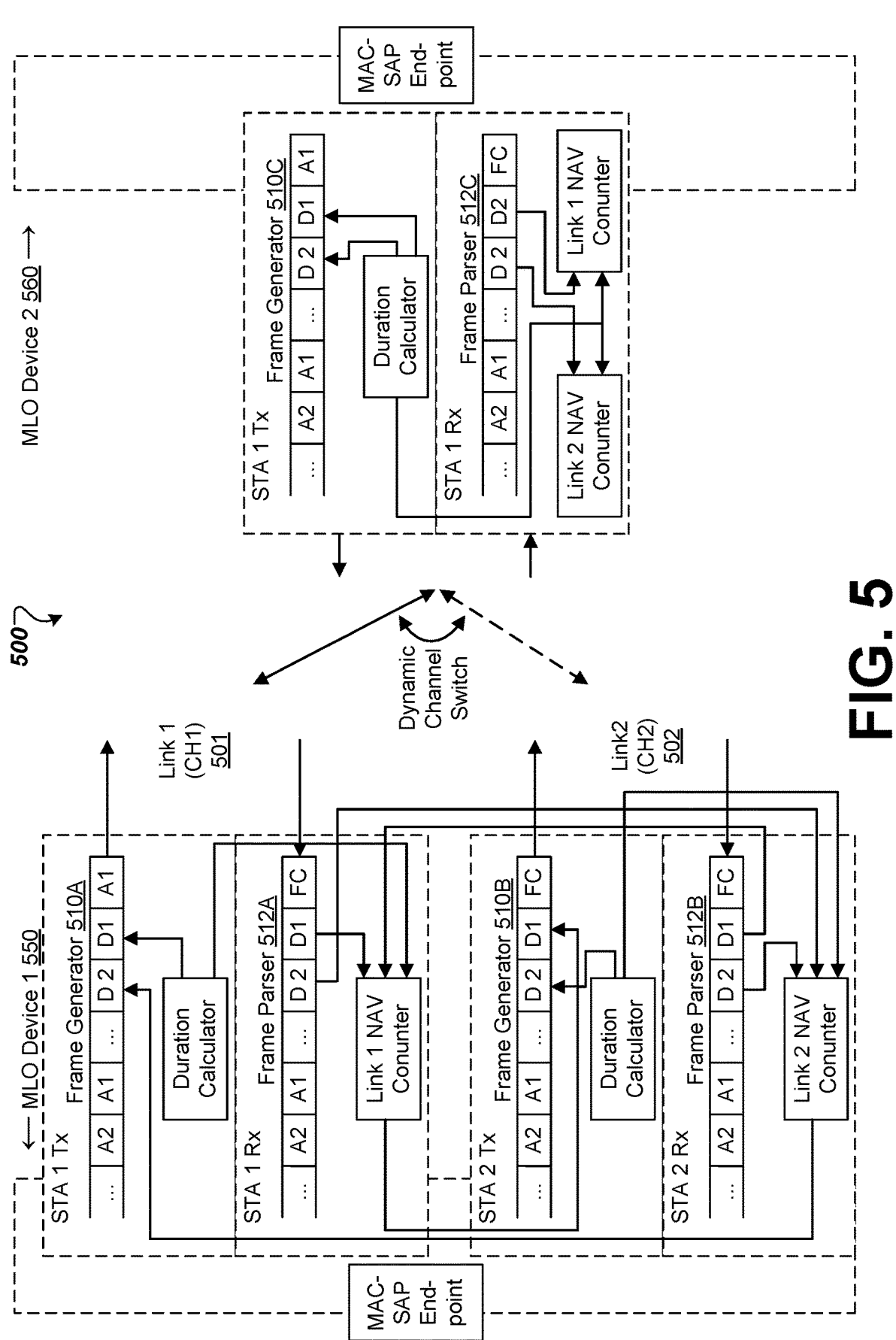
FIG. 5 is a block diagram of frame generation and frame parsing for virtual carrier sensing in MLO, according to some embodiments.

FIG. 5 is a block diagram 500 of frame generation and frame parsing for virtual carrier sensing in MLO, according to some embodiments.

In some embodiments, frame generation and frame parsing for virtual carrier sensing in MLO transmissions is done by STR and eMLSR devices. In some embodiments, a frame generator will insert the duration of a packet in a Duration_N field in the MAC Header of frames corresponding to the Link_N if the transmission is happening on Link_N and insert the NAV timer from the other Link_M to other the Duration_M.

In some embodiments, frame generation and frame parsing for virtual carrier sensing in MLO reception is done by STR and eMLSR devices. In some embodiments, a frame parser will parse a Duration_N and Duration_M (e.g., durations D1 and D2) from received frames from two links (e.g., link 1 501 and link 2 502) and will update the NAV timers of the corresponding links.

In some embodiments, frame generation and frame parsing for virtual carrier sensing in MLO transmissions is done by MLSR devices (e.g., MLO device 2 560). In some embodiments, a frame generator (e.g., frame generator

510C) will insert the duration of the packet (e.g., link occupancy information) in the Duration_N field (e.g., D1) in the MAC Header of frames corresponding to the Link_N (e.g., link 1 501) if the transmission is happening on that Link_N and insert a predefined identifier (e.g., 0xFFFF) to indicate that the state of the other link is unknown to MLSR device 2 560.

In some embodiments, frame generation and frame parsing for virtual carrier sensing in MLO reception is done by MLSR devices. In some embodiments, a frame parser will parse a Duration_N and Duration_M (e.g., durations D1 and D2) from received frames from two links (e.g., link 1 501 and link 2 502) while the MLSR device has switched to, e.g., link 2 502, where it acquired Duration_M or D2 from the received frame on link 2 502 and will update the NAV timers of the corresponding links. In some embodiments, the received frames may be sent by an STR and/or eMLSR device (e.g., MLO device 1 550). In other embodiments, the received frames may be sent by an MLSR device.

In some embodiments, link occupancy information (e.g., NAV information, NAV timers, etc.) corresponding to links may be used to determine which link/channel a device may use to perform a transmission. In some embodiments, an MLSR device may also maintain multiple NAV Timers to track the state of multiple links and/or channels.

In some embodiments, link occupancy information may be shared in either a legacy control frame or an MLO-compliant RTS or CTS control frame. Legacy RTS and CTS control frames already contain a field for link occupancy information. In some embodiments, an MLO-compliant RTS or CTS frame may have additional link occupancy information corresponding to links/channels other than the link/channel that the MLO-compliant RTS or CTS frame is being sent on. In some embodiments, a legacy frame refers to frame types already part of the current or future WLAN standards.

Figure 6A:
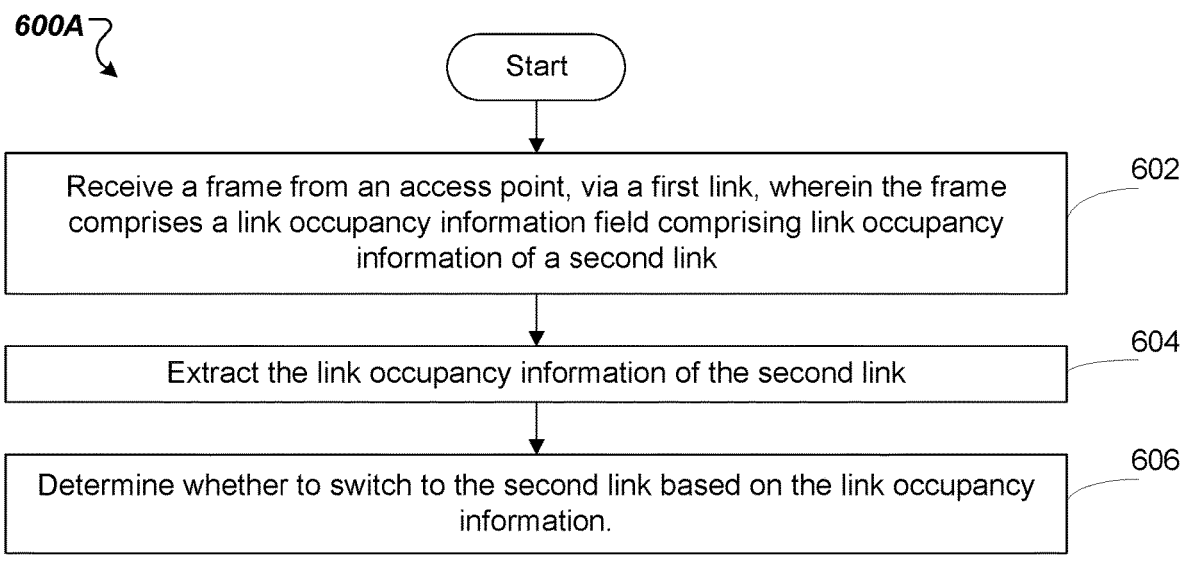
FIG. 6A is a flow diagram of a method of performing a network-aided multi-link operation for single-radio devices, according to some embodiments.
Figure 6B:
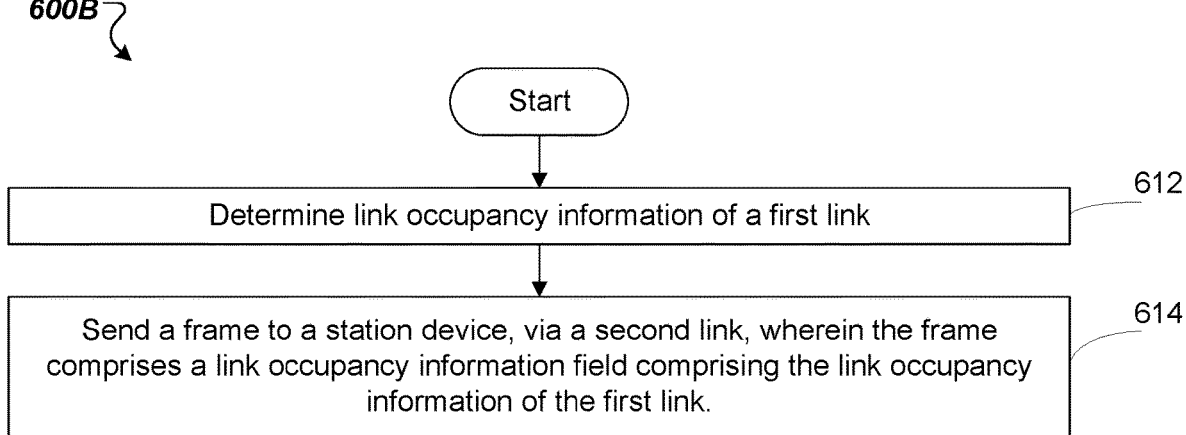
FIG. 6B is a flow diagram of a method of performing a network-aided multi-link operation for single-radio devices, according to some embodiments.

FIGS. 6A-B are flow diagrams of methods of performing a network-aided multi-link operation for single-radio devices according to various embodiments. The methods 600A-B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, methods 600A-B are performed by control logic and/or hardware of one of the MLO devices of FIG. 1 or 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 6A is a flow diagram of a method of performing a network-aided multi-link operation for single-radio devices, according to some embodiments.

Method 600A begins at block 602, where processing logic performing the method receives a frame from an access point, via a first link, where the frame includes a link occupancy information field comprising link occupancy information of a second link.

In some embodiments, the frame may be a legacy frame having multiple legacy fields, and the link occupancy information field may be an additional field added to the legacy fields of the legacy frame. For example, in some embodiments, the link occupancy information field may be added to the existing legacy frame (i.e., in addition to the multiple legacy fields already existing in legacy frames). In some embodiments, a legacy frame may refer to a type of frame format used in an earlier version of a wireless protocol or standard (e.g., Wi-Fi6, IEEE 802.11ax wireless standard). Fields contained in legacy frames may also be referred to as legacy fields (a field used in frames of an earlier version of a wireless protocol or standard). In some embodiments, a legacy field may refer to a type of field used in an earlier version of a wireless protocol or standard (e.g., IEEE 802.11ax wireless standard). Legacy frames have a frame format that includes fields for the MAC header, the frame body, and the FCS field. In some embodiments, the link occupancy information field may be added to the existing legacy frame (i.e., in addition to the multiple legacy fields already existing in legacy frames).

In some embodiments, the frame may be at least one of an MLO-compliant RTS frame or an MLO-compliant CTS frame. In some embodiments, an MLO-compliant RTS frame or an MLO-compliant CTS frame may be a legacy RTS or CTS frame. RTS and CTS frames are two control frames used in the IEEE 802.11 WLAN standard to manage access to the wireless medium. Each contains a duration/ID field specifying the amount of time that the sender will be occupying the wireless medium. This helps to prevent other devices from transmitting during that time. In some embodiments, an MLO-compliant RTS frame or an MLO-compliant CTS frame may contain link occupancy information of some or all the links or channels in a network. Such an MLO-compliant RTS frame or an MLO-compliant CTS frame may be received by any device on the network that is occupying the channel or medium the frames are sent on.

In some embodiments, the link occupancy information includes link occupancy duration information. Duration information may include the amount of time a transmission will take or the time remaining in a transmission. In some embodiments, this may be expressed as a NAV or NAV timer.

In some embodiments, the link occupancy information includes at least one of NAV information or V-CRS information.

In some embodiments, the access point may be at least one of an STR device or an eMLSR device. In some embodiments, the second MLO device is a multi-link single-radio (MLSR) device.

At block 604, the processing logic extracts (e.g., decodes) the link occupancy information of the second link.

At block 606, the processing logic determines whether to switch to the second link based on the link occupancy information.

FIG. 6B is a flow diagram of a method of performing a network-aided multi-link operation for single-radio devices, according to some embodiments.

Method 600B begins at block 612, where processing logic performing the method determines link occupancy information of a first link. In some embodiments, the link occupancy information is determined via P-CRS or V-CRS. In some embodiments, an STR or eMLSR device determines the link occupancy information. In some embodiments, an MLSR devices determines the link occupancy information.

At block 614, the processing logic sends a frame to a station device (e.g., STA-MLSR 290 of FIG. 2), via a second link, where the frame includes a link occupancy information field, including the link occupancy information of the first link.

In some embodiments, the frame may be a legacy frame having multiple legacy fields, and the link occupancy information field may be an additional field added to the legacy fields of the legacy frame. For example, in some embodiments, the link occupancy information field may be added to the existing legacy frame (i.e., in addition to the multiple legacy fields already existing in legacy frames). In some embodiments, a legacy frame may refer to a type of frame format used in an earlier version of a wireless protocol or standard (e.g., IEEE 802.11ax wireless standard). Fields contained in legacy frames may also be referred to as legacy fields (a field used in frames of an earlier version of a wireless protocol or standard). In some embodiments, a legacy field may refer to a type of field used in an earlier version of a wireless protocol or standard (e.g., IEEE 802.11ax wireless standard). Legacy frames have a frame format that includes fields for the MAC header, the frame body, and the FCS field. In some embodiments, the link occupancy information field may be an additional field added to the multiple fields (i.e., legacy fields) that already exist in legacy frames. In some embodiments, the link occupancy information field may be added to the existing legacy frame (i.e., in addition to the multiple legacy fields already existing in legacy frames).

In some embodiments, the frame may be at least one of an MLO-compliant RTS frame or an MLO-compliant CTS frame. In some embodiments, an MLO-compliant RTS frame or an MLO-compliant CTS frame may be a legacy RTS or CTS frame. RTS and CTS frames are two control frames used in the IEEE 802.11 WLAN standard to manage access to the wireless medium. Each contains a duration/ID field specifying the amount of time that the sender will be occupying the wireless medium. This helps to prevent other devices from transmitting during that time. In some embodiments, an MLO-compliant RTS frame or an MLO-compliant CTS frame may contain link occupancy information of some or all the links or channels in a network. Such an MLO-compliant RTS frame or an MLO-compliant CTS frame may be received by any device on the network that is occupying the channel or medium the frames are sent on.

In some embodiments, the station device may be a multi-link single-radio (MLSR) device.

In some embodiments, the link occupancy information may include link occupancy duration information. Duration information may include the amount of time a transmission will take or the time remaining in a transmission. In some embodiments, this may be expressed as a NAV or NAV timer.

In some embodiments, the link occupancy information may include at least one of NAV information or V-CRS information.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments, the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A system comprising:
a first multi-link operation (MLO) device; and
a second MLO device, wherein the first MLO device is to:
    send a frame to the second MLO device via a first link, wherein the frame comprises a link occupancy information field comprising link occupancy information of a second link,
wherein the frame comprises a legacy frame having a plurality of legacy fields and wherein the link occupancy information field is an additional field added to the plurality of legacy fields.

2. The system of claim 1, wherein the frame is at least one of an MLO-compliant request-to-send (RTS) frame or an MLO-compliant clear-to-send (CTS) frame.

3. The system of claim 1, wherein the link occupancy information comprises link occupancy duration information.

4. The system of claim 1, wherein the link occupancy information comprises at least of network allocation vector (NAV) information or virtual carrier sense (V-CRS) information.

5. The system of claim 1, wherein the first MLO device is at least one of a simultaneous transmit and receive (STR) device or an enhanced multi-link single radio (eMLSR) device; and
    the second MLO device is a multi-link single-radio (MLSR) device.

6. The system of claim 1, wherein the second MLO device is to:
    receive the frame via the first link;
    extract the link occupancy information of the second link; and
    determining whether to switch to the second link, based on the link occupancy information of the second link.

7. The system of claim 1, wherein the link occupancy information of the second link indicates that a status of the second link is unknown.

8. A method comprising:
    receiving a frame from an access point, via a first link, wherein the frame comprises a link occupancy information field comprising link occupancy information of a second link;
    extracting the link occupancy information of the second link; and
    determining whether to switch to the second link based on the link occupancy information,
    wherein the frame comprises a legacy frame having a plurality of legacy fields, and wherein the link occupancy information field is an additional field added to the plurality of legacy fields.

9. The method of claim 8, wherein the frame is at least one of an MLO-compliant request-to-send (RTS) frame or an MLO-compliant clear-to-send (CTS) frame.

10. The method of claim 8, wherein the link occupancy information comprises link occupancy duration information.

11. The method of claim 8, wherein the link occupancy information comprises at least one of network allocation vector (NAV) information or virtual carrier sense (V-CRS) information.

12. The method of claim 8, wherein the access point comprises at least one of a simultaneous transmit and receive (STR) device or an enhanced multi-link single radio (eMLSR) device.

13. A method comprising:
    determining link occupancy information of a first link; and
    sending a frame to a station device, via a second link, wherein the frame comprises a link occupancy information field comprising the link occupancy information of the first link,
    wherein the frame comprises a legacy frame having a plurality of legacy fields, and wherein the link occupancy information field is an additional field added to the plurality of legacy fields.

14. The method of claim 13, wherein the frame is at least one of an MLO-compliant request-to-send (RTS) frame or an MLO-compliant clear-to-send (CTS) frame.

15. The method of claim 13, wherein the station device comprises a multi-link single-radio (MLSR) device.

16. The method of claim 13, wherein the link occupancy information comprises link occupancy duration information.

17. The method of claim 13, wherein the link occupancy information comprises at least one of network allocation vector (NAV) information or virtual carrier sense (V-CRS) information.

* * * * *